United States Patent Office 3,457,309
Patented July 22, 1969

3,457,309
BROMINATION OF SALICYLANILIDE
Raymond E. Werner and Robert A. Roberts, Cincinnati, Ohio, assignors to Sterling Drug Inc., New York, N.Y., a corporation of Delaware
No Drawing. Filed May 3, 1966, Ser. No. 547,159
Int. Cl. C07c *103/26;* C01b *7/10*
U.S. Cl. 260—559                                    7 Claims

ABSTRACT OF THE DISCLOSURE

In the process for preparing bromosalicylanilides rich in tribromsalan by the interaction of bromine with salicylanilide, the use of an aluminum halide catalyst inhibits the formation of tetrabromosalicylanilide and the addition of an alkali metal chlorate increases the yield of tribromsalan and oxidizes the bromide ion by-product to bromine.

---

This invention relates to chemical processes and new and useful improvements therein. More particularly, the invention relates to improved processes for preparing 3,4′,5-tribromosalicylanilide, that is, the 4-bromoanilide of 3,5-dibromosalicylic acid, by brominating salicylanilide.

The compound 3,4′,5-tribromosalicylanilide (hereinafter called tribromsalan) is known to be a valuable germicide which is particularly adapted for incorporation into soap and detergent compositions. The commonly available commercial grade of tribromsalan is contaminated with significant quantities of at least one, and more often several, other halogenated salicylanilides, for example 3,5 - dibromosalicylanilide, 4′,5 - dibromosalicylanilide (dibromsalan), 2′,3,4′,5-tetrabromosalicylanilide, 4′-bromosalicylanilide and 5-bromosalicylanilide, which are invariably formed during the bromination process. Until recently, the presence of the halogenated contaminants has been accepted or even deemed desirable because the contaminants also have germicidal properties. However, more recent investigations have shown that at least some of the halogenated salicylanilide contaminants have very undesirable skin-photosensitization effects not attributable to tribromsalan per se. A method for preparing tribromsalan free of halogenated contaminants is therefore sought by the industry.

Pure tribromsalan can be prepared in the laboratory by condensing 4-bromoaniline with 3,5-dibromosalicylic acid; however, this process is too expensive to be conducted on a commercial scale, and methods have been sought to produce the compound in pure form and in good yield by the bromination of salicylanilide. A major problem in the synthesis is the tendency of salicylanilide to over-brominate to 2′,3,4′,5-tetrabromosalicylanilide and to under-brominate to mixtures of mono- and dibromosalicylanilide, thus giving the impure commercial form mentioned above. A particularly desirable process would be one wherein over-bromination is prevented even in the presence of sufficient excess of bromine to assure complete bromination to tribromosalicylanilide. However, the use of an excess of bromine on a commercial scale, assuming the ability to prevent over-bromination, ordinarily would be undesirable because of the high cost of bromine.

The prior art teaches that bromination of salicylanilide in certain reaction media, for example, aqueous acetic acid, tends to produce nearly pure tribromsalan. However, newer analytical techniques, which have been developed because of the necessity to eliminate skin-photosensitizing contaminants, have shown that the synthetic methods of the prior art actually produce greater quantities and a greater variety of contaminants than could previously be detected. The high quality tribromsalan required by the more recent standards is not readily available by methods taught in the prior art.

The prior art also teaches that bromination can be effected more economically by oxidizing with chlorine the hydrogen bromide produced as a bromination by-product. This process, however, is unsatifactory for producing pure tribromsalan because of the tendency of the chlorine to react with the other reagents present to form chlorinated contaminants.

It is an object of the present invention to provide an economical process for preparing high quality brominated salicylanilides.

It is an object of the present invention to provide a process for preparing brominated salicylanilide essentially free of halogenated contaminants when analyzed according to modern analytical techniques.

In accordance with one aspect of this invention, we provide an improvement in the process for brominating salicylanilide by interaction of the latter with bromine to produce nuclear brominated salicylanilide which comprises the addition of aluminum halide as an over-bromination-preventing catalyst which prevents the formation of tetrabromosalicylanilide, in particular, 2′,3,4′,5-tetrabromosalicylanilide. We have found that by the use of an aluminum halide as a catalyst, bromination beyond the tribrominated product is essentially completely eliminated.

The novel process is useful not only for preparing mixtures of the di- and tri-bromosalicylanilides but also for preparing essentially pure tribromsalan. Thus, an excess of bromine can be employed without the danger of over-bromination; and, as a result, tribromsalan can be produced in very high yield and completely free of detectable quantities of mono- and di-bromosalicylanilides.

By the term aluminum halide, we mean a member of the group consisting of aluminum fluoride, aluminum chloride, aluminum bromide and alumnium iodide. By reason of its cheapness aluminum chloride is the preferred catalyst. We prefer, although we do not consider it essential, to use the anhydrous form of aluminum chloride. Throughout this specification, when we use the term aluminum chloride it will be understood that any of the aforementioned aluminum halides can be substituted as its full equivalent.

The quantity of aluminum chloride catalyst employed in our new process is variable within rather wide limits. The bromination-controlling effects of the catalyst can be observed when as little as 0.01 molecular proportion of aluminum chloride per molecular proportion of salicylanilide is employed, and considerably better bromination control is attained when as much as 1.0 molecular proportion of aluminum chloride per molecular proportion of salicylanilide is used. On the other hand, when the larger proportions of aluminum chloride are employed, the yields obtained from the reaction and slightly decreased. We prefer to use from 0.05 to 0.8, for example, 0.15 molecular proportion of aluminum chloride for each molecular proportion of salicylanilide reactant, because within the stated range effective use is made of the beneficial effects of aluminum chloride without excessively lowering the efficiency of the process.

The bromination is conveniently conducted in a medium in which both salicylanilide and aluminum chloride are soluble. We have found that glacial acetic acid is an excellent solvent for this purpose. The adaptability of acetic acid as a solvent in our process is particularly surprising, for, as taught by the prior art and confirmed by us, attempts to prepare tribromsalan by direct bromination of salicylanilide in glacial acetic acid in the absence of aluminum chloride invariably lead to mixtures of brominated salicylanilides containing large proportions of 4′,5-dibromosalicylanilide (usually about 50 percent), and the yields are invariably poor. The use of glacial acetic acid is a decided advantage because the solvent is inexpensive, and the brominated salicylanilides crystallize easily from the acetic acid reaction mixture. Other solvents which we have used, for example, methyl alcohol, chloroform and nitrobenzene, have been found to be somewhat less advantageous.

The reaction temperature should be kept rather low, because at higher temperatures (90–100° C.) the bromination-controlling effect of aluminum chloride is considerably decreased. We prefer to carry out the reaction at temperatures between 50° C. and 65° C., because in that temperature range the reaction proceeds at a conveniently rapid rate. We do not consider the exact reaction temperature to be critical.

The catalytic effect of aluminum chloride (halides) in our process appears to be unique, for we have found that other catalysts of the Lewis acid type, for example, boron trifluoride, ferric chloride, hydrogen chloride, zinc chloride, stannic chloride, cupric bromide, and antimony pentachloride, do not give the high degree of bromination control exhibited by aluminum chloride.

In accordance with another aspect of this invention, we provide an improvement in the process for preparing brominated salicylanilides by the reaction of salicylanilide with bromine which comprises employing as the brominating agent approximately one-half the theoretical quantity of bromine, and sufficient alkali metal chlorate to completely oxidize the hydrogen bromide end by-product to bromine. For example, tribromsalan is conveniently prepared by brominating saliscylanilide with approximately 1.5 molecular proportions of bromine and at least 0.5 molecular proportion of an alkali metal chlorate, for example sodium chlorate and potassium chlorate. For convenience, we shall use the term sodium chlorate which will be understood to include equivalent metal chlorates. Sodium chlorate oxidizes the hydrogen bromide by-product to bromine according to the following equation:

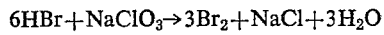

$$6HBr + NaClO_3 \rightarrow 3Br_2 + NaCl + 3H_2O$$

It will be seen from the above equation that the only by-products of our bromination process are sodium chloride and water; since valuable hydrogen bromide is not lost as a by-product, this process results in a considerable economic advantage. A surprising feature of this aspect of the invention resides in the discovery that 3,4′,5-tribromosalicylanilide is prepared in excellent yields in glacial acetic acid when sodium chlorate is employed as an oxidizing agent, even in the absence of aluminum chloride. Thus, in the absence of a catalyst, the yield of tribromsalan from the bromination of salicylanilide in glacial acetic acid was increased from about 48 percent, when bromine alone was used, to about 92 percent when one-half the theoretical quantity of bromine was used and sodium chlorate was employed as an oxidizing agent.

Although sodium chlorate oxidation vastly increases the yield of tribromsalan in our process, it does not share the effect of aluminum chloride in preventing the formation of 2′,3,4′,5-tetrabromosalicylanilide. In the absence of aluminum chloride catalyst, the product obtained according to this second aspect of our invention contained, for example, 3,5-dibromosalicylanilide, 4′,5-dibromosalicylanilide, 2′,3,4′,5-tetrabromosalicylanilide, 4′ - bromosalicylanilide, and 5-bromosalicylanilide as minor by-products. The benefits to be gained from this aspect of the invention are primarily the increased yield of tribromsalan and the decreased cost of product due to complete utilization of the bromine reactant.

By combining the two aspects of our invention described above, we provide an improved process for preparing tribromosalan essentially free of halogenated contaminants. Aluminum chloride, in an amount from 0.01 to 1.0 molecular proportion per molecular proportion of salicylanilide, is employed as a bromination-controlling catalyst, allowing the use of an excess of bromine. The bromine required to brominate salicylanilide to tribromsalan in good yield is economically producd by employing about 1.5 molecular proportions of bromine along with at least 0.5 molecular proportion of sodium chlorate as an oxidizing agent. At the same time, the beneficial effect of the sodium chlorate in substantially increasing the yield of tribromsalan is used to good advantage. By the use of this procedure, we have prepared tribromsalan which, when isolated directly from the reaction mixture, contains only a trace of 2′,3,4′,5-tetrabromosalicylanilide as the sole halogenated salicylanilide impurity. By trace we mean a quantity not measurable even by the modern techniques, described below, which are capable of measuring impurities in an amount less than 0.5 percent. The product so produced has been found to be free of skin-photosensitization effects.

The analysis of the products made by our new process was carried out by quantitative thin layer chromatographic (TLC) techniques. The individual products were separated on chromatographic plates, each of which consisted of a glass plate bearing a layer of silica gel of 250 micron thickness which had been activated by heating for one-half to one hour at 110° C. Two solvent systems were used, one consisting of chloroform-benzene-formic acid (70:28:2) and the other, benzene-formic acid (98:2).

Additional details of the aspects of our invention are presented in the following examples, which are given for the purpose of illustrating the invention without limiting it thereto.

EXAMPLE I

A. Salicylanilide was brominated in glacial acetic acid in the absence of aluminum chloride as follows: A solution of bromosalicyanilide was prepared by dissolving 53.3 g. (0.25 molecular proportions) of salicylanilide in 375 g. of glacial acetic acid. The solution was heated to 55–60° C. and bromine (122.0 g.; 0.765 molecular proportion) was added dropwise over a period of two hours, while the temperature was maintained at 55–60° C. The reaction mixture was maintained at that temperature and stirred for another two hours. Starch iodide paper indicated the presence of free bromine in the mixture, which was then cooled to 18–20° C. and stirred for one hour. The product was collected on a filter and washed with 175 ml. of methanol in two portions. The filtrate from the latter washing was free of bromine and acid. The product was dried at 95–100° C. The yield was 77.6 g. of a product which melted at 198–217° C. Thin layer chromatographic analysis showed this material to be 48 percent tribromsalan, 48 percent 4′,5-dibromosalicylanilides, about 2 percent other dibromosalicylanilides, and approximately 0.3 percent 2′,3,4′,5-tetrabromosalicylanilide.

B. Salicylanilide was brominated in aqueous acetic acid in the absence of aluminum chloride as follows: Following the general procedure given in Example IA, 53.3 g. (0.25 molecular proportion) of salicylanilide was brominated with 125.0 g. (0.785 molecular proportion) of bromine in a solution containing 375 g. of glacial acetic acid and 125 ml. of water. After cooling the product, washing it with three 50 ml. portions of methanol and one 500 ml. portion of water and drying the product at 100° C., there was obtained 107.6 g. (95.6 percent based upon tribromsalan) of white powder, which by analysis, using thin layer chromatography, showed that it contained 7 percent of 3,5-dibromosalicylanilide, 2 percent of 4′,5-salicylanilide, 1.5 percent of 2′,3,4′,5-tetrabromosalicylanilide, one percent of 4′-bromosalicylanilide and a trace of 5-bromosalicylanilide.

The following chromatographic analytical techniques were employed in the quanitative determination of 3,4′,5-tribromosalicylanilide in the samples and in the identification and estimation of contaminants when present:

Determination of tribromsalan

Prepare separate standard solutions of tribromsalan and the sample to be analyzed by dissolving 125 mg. each of tribromsalan and the sample in 80:20 methanol-ether sufficient to make 50.0 ml. of solution. Prepare the chromatographic plates according to the method of Stahl [Egon Stahl, "Thin-Layer Chromatography," Academic Press, Inc., New York, 1965], using silica gel (Merck $GF_{254}$) 250 microns thick, spread on 20 x 20 cm. glass plates and activated for one-half hour at 110° C. Divide the chromatographic plate into two halves by scribing with a pencil. Apply 0.15 ml. of the standard solution to one-half of the plate in the form of a 7 cm. band parallel to and about 2 cm. above the bottom edge of the plate. Apply 0.15 ml. of the sample solution to the other half of the chromatographic plate in the same way. Develop the plate with benzene-formic acid (98:2) until the solvent front reaches the top of the plate (18 cm.). Remove the plate and evaporate the solvent in a stream of warm air. Carefully outline with a sharp needle the tribromsalan bands as visualized under short wave length ultra-violet light. Remove the bands using a vacuum zone extractor [J. S. Matthews et al., J. Chromatography 9, 331 (1962)] and elute each into separate 25 ml. volumetric flasks with 20 ml. of methanol. Add 0.2 ml. of formic acid to each flask and dilute to the mark with methanol. Read the absorbence of each solution at 279 millimicrons against a reagent blank prepared by transferring 0.2 ml. of formic acid to a 25 ml. volumetric flask and diluted to the mark with methanol. Calculate the percentage of tribromsalan in the sample by comparison with the reference standard. Ordinarily we run the samples in duplicate or triplicate.

Identification and estimation of contaminants

Prepare the chromatographic plates as described above and activate the plates by heating for one hour at 110° C. Prepare a one percent solution of the sample to be tested in 1:9 methanol benzene. Apply ten microliters of the sample to the chromatographic plate in the usual manner. Prepare appropriate amount of each reference standard solution and apply to the chromatographic plate either separately or in a mixture. Develop the chromatogram using the solvent system chloroform-benzene-formic acid (70:28:2). By employing this system, the tribromsalan and its various contaminants are efficiently separated. The Rf values (the Rf value is the distance traveled by the individual band divided by the total distance traveled by the solvent front) for the individual products are as follows:

|  | Rf |
|---|---|
| Salicylanilide | 0.40 |
| 4′-bromosalicylanilide | 0.44 |
| 5-tribromosalicylanilide | 0.47 |
| 4′,5-dibromosalicylanilide | 0.50 |
| 3,5-dibromosalicylanilide | 0.54 |
| 3,4′,5-tribromosalicylanilide (tribromsalan) | 0.59 |
| 2′,3,4′,5-tetrabromosalicylanilide | 0.84 |

Evaporate the solvent from the plate in a stream of dry air and locate the bands under ultra-violet light. The fluorescence of the products is greatly enhanced by spraying the plate with 5–10 ml. of diethylamine. By comparison with the standards, identification of each contaminant and estimation of the quantities thereof are easily made.

EXAMPLE 2

A solution containing 8.0 g. (0.06 molecular proportions) of anhydrous aluminum chloride dissolved in 1500 g. of glacial acetic acid was heated to 55–60° C. and to it was added 213.2 g. (1.0 molecular proportion) of salicylanilide. After complete solution was effected 328 g. (2.05 molecular proportions) of bromine was added slowly while the temperature was maintained at 55–60° C. Stirring was continued for one hour, and then 72.8 g. (0.68 molecular proportion) of sodium chlorate was added over a period of one hour while the temperature of the mixture was maintained at 55–60° C. with a cooling bath. Stirring was continued for three hours, at which time the mixture was cooled to 20° C. and filtered. The filter cake was washed with 640 ml. of methanol in three portions and then with 2,000 ml. of cold water. The product was dried at 80–100° C. The yield was 418 g. (92.9 percent based upon tribromsalan) of white amorphous product which contained 3 percent of 4′,5-dibromosalicylanilide, 3.5 percent of 3,5-dibromosalicylanilide and a trace each of 2′,3,4′,5 - tetrabromosalicylanilide and 4′ - bromosalicylanilide, as analyzed by thin layer chromatography.

EXAMPLE 3

Following the general procedure given in Example 2, 53.3 g. of salicylanilide was brominated in 375 g. of glacial acetic acid containing 24.0 g. (0.18 molecular proportion) of anhydrous aluminum chloride, i.e., 0.72 mole of aluminum chloride per mole of salicylanilide. The product was collected on a filter, and the filter cake was washed with two 60 ml. portions of glacial acetic acid and then with 3 liters of cold water. The product was dried at 90–110° C. There was thus obtained 97.3 g. (86.5% based upon tribromsalan) of white amorphous product melting at 217–223° C. and having a total bromine content of 51.69%. Thin layer chromatographic analysis of the product showed that it contained a trace (less than 0.3%) of 2′,3,4′,5-tetrabromosalicylanilide, but no other brominated salicylanilides.

When this experiment was repeated, using aluminum bromide in place of aluminum chloride, a somewhat lower yield of tribromsalan was obtained, but substantially the same effect of suppressing the formation of 2′,3,4′,5-tetrabromosalicylanilide was observed.

The examples given above are summarized in the following table:

TABLE

| Bromination Reactant | Solvent | Catalyst | Percent yield | Contaminants Percent 3,5-DBS | Percent 4′,5-DBS | Percent 2′,3,4′, 5-TBS |
|---|---|---|---|---|---|---|
| Bromine | Gl.HOAc | (¹) | 69 | 2 | 48 | 0.3 |
| Do | 75% HOAc | (¹) | 95.6 | 7 | 2 | 1.5 |
| Br₂ plus NaCO₃ | Gl. HOAc | 0.06 mole AlCl₃ | 92.9 | 3.5 | 3 | (²) |
| Br₂ plus NaClO₃ | Gl. HOAc | 0.72 mole AlCl₃ | 86.2 | (¹) | (¹) | (²) |

Gl.HOAc=glacial acetic acid DBS=dibromosalicylanilide; TBS=tetrabromosalicylanilide ¹ None.
² Trace.

We claim:
1. In a process involving the bromination of salicylanilide in an inert solvent by interaction with bromine to produce bromosalicylanilides, the improvement which comprises the addition of at least 0.01 molecular proportion of aluminum halide per molecular proportion of salicylanilide to the reaction mixture to prevent the formation of tetrabromosalicylanilide.

2. The process according to claim 1 wherein the aluminum halide is anhydrous aluminum chloride.

3. The process according to claim 1 wherein the aluminum halide is anhydrous aluminum chloride in the amount of 0.01 to 1.0 molecular proportion per molecular proportion of salicylanilide.

4. A process according to claim 1 wherein the aluminum halide is anhydrous aluminum chloride in the amount of 0.01 to 1.0 molecular proportion per molecular proportion of salicylanilide, the bromine is provided by at least 1.5 molecular proportions of bromine and at least 0.5 molecular proportion of alkali metal chlorate, and the reaction is conducted in glacial acetic acid.

5. A process according to claim 1 wherein the aluminum halide is anhydrous aluminum chloride in the amount of approximately 0.7 molecular proportion per molecular proportion of salicylanilide, the bromine is provided by at least 1.5 molecular proportions of bromine and at least 0.5 molecular proportion of alkali metal chlorate, and the reaction is conducted in glacial acetic acid.

6. A process according to claim 1 wherein the aluminum halide is anhydrous aluminum chloride in the amount of approximately 0.15 molecular proportion per molecular proportion of salicylanilide, the bromine is provided by at least 1.5 molecular proportions of bromine and at least 0.5 molecular proportion of alkali metal chlorate, and the reaction is conducted in glacial acetic acid.

7. In a process for brominating salicylanilide in an inert solvent to prepare 3,4′,5-tribromosalicylanilide, the improvement which comprises employing as the brominating agent approximately 1.5 molecular proportions of bromine and at least 0.5 molecular proportion of an alkali metal chlorate.

References Cited
UNITED STATES PATENTS 3,064,048 11/1962 Schramm et al. _____ 260—559

HENRY R. JILES, Primary Examiner

HARRY I. MOATZ, Assistant Examiner

U.S. Cl. X.R.

23—216